US012296710B2

(12) United States Patent
Irarrazaval et al.

(10) Patent No.: US 12,296,710 B2
(45) Date of Patent: May 13, 2025

(54) BATTERY-EXCHANGE SERVICE STATION

(71) Applicant: Ample, Inc., San Francisco, CA (US)

(72) Inventors: Juan Spiniak Irarrazaval, San Francisco, CA (US); Kenji Bowers, San Francisco, CA (US)

(73) Assignee: Ample, Inc., San Francisco, CA (US)

( * ) Notice: Subject to any disclaimer, the term of this patent is extended or adjusted under 35 U.S.C. 154(b) by 0 days.

(21) Appl. No.: 18/666,233

(22) Filed: May 16, 2024

(65) Prior Publication Data

US 2024/0383369 A1 Nov. 21, 2024

Related U.S. Application Data

(60) Provisional application No. 63/502,434, filed on May 16, 2023.

(51) Int. Cl.
*G06F 7/00* (2006.01)
*B60L 53/80* (2019.01)

(52) U.S. Cl.
CPC ..................... *B60L 53/80* (2019.02)

(58) Field of Classification Search
CPC ............... B60L 53/80; B60L 53/37
USPC ................ 700/213, 214, 217, 228
See application file for complete search history.

(56) References Cited

U.S. PATENT DOCUMENTS

| 4,102,273 | A | 7/1978 | Merkle et al. |
| 5,545,967 | A | 8/1996 | Osborne et al. |
| 5,825,981 | A | 10/1998 | Matsuda |
| 6,094,028 | A | 7/2000 | Gu et al. |
| 7,066,291 | B2 | 6/2006 | Martins et al. |
| 7,139,642 | B2 | 11/2006 | Kamoto et al. |
| 8,006,793 | B2 | 8/2011 | Heichal et al. |

(Continued)

FOREIGN PATENT DOCUMENTS

| CN | 104787010 B | 9/2017 |
| CN | 212751289 U | 3/2021 |

(Continued)

OTHER PUBLICATIONS

ISA, International Search Report for PCT/US20/40070, Nov. 17, 2020.

(Continued)

*Primary Examiner* — Yolanda R Cumbess
(74) *Attorney, Agent, or Firm* — Intrinsic Law Corp.

(57) ABSTRACT

A method of operating a battery-exchange service station includes receiving data corresponding to a vehicle to be serviced; automatically adjusting a size of a service platform according to the vehicle, the service platform disposed over a service cavity configured to receive a service robot; automatically presenting one or more visual indicators to guide the vehicle onto the service platform such that the vehicle's front tires are at a target position; automatically detecting a position of the vehicle's front tires with lasers and light sensors, each laser located at a predetermined position relative to the target position for the front tires; automatically updating at least one of the visual indicator(s) based on a detected position of the vehicle's front tires; and while the detected position is at the target position, automatically exchanging one or more depleted batteries in the vehicle, with the service robot, with one or more charged batteries.

7 Claims, 12 Drawing Sheets

(56) References Cited

U.S. PATENT DOCUMENTS

| | | | |
|---|---|---|---|
| 8,516,687 | B2 | 8/2013 | Hozumi et al. |
| 8,517,132 | B2 | 8/2013 | Heichal et al. |
| 8,573,335 | B2 | 11/2013 | Rudakevych |
| 8,868,235 | B2 | 10/2014 | Zhao et al. |
| 8,869,384 | B2 | 10/2014 | Park et al. |
| 9,016,417 | B2 | 4/2015 | Ohgitani et al. |
| 9,216,718 | B2 | 12/2015 | Ojima et al. |
| 9,868,421 | B2 | 1/2018 | Hassounah |
| 2004/0093650 | A1 | 5/2004 | Martins et al. |
| 2008/0294283 | A1 | 11/2008 | Ligrano |
| 2009/0058355 | A1 | 3/2009 | Meyer |
| 2011/0112710 | A1 | 5/2011 | Meyer-Ebeling et al. |
| 2011/0113609 | A1 | 5/2011 | Berdelle-Hilge et al. |
| 2011/0223459 | A1 | 9/2011 | Heichal |
| 2012/0009804 | A1 | 1/2012 | Heichal et al. |
| 2012/0068664 | A1 | 3/2012 | Franzen et al. |
| 2012/0158229 | A1 | 6/2012 | Schaefer |
| 2013/0076902 | A1 | 3/2013 | Gao et al. |
| 2013/0221916 | A1 | 8/2013 | Kelty et al. |
| 2013/0226345 | A1 | 8/2013 | Zhao et al. |
| 2014/0175873 | A1 | 6/2014 | Kishimoto et al. |
| 2014/0369798 | A1 | 12/2014 | Escande et al. |
| 2015/0044518 | A1 | 2/2015 | Scheucher |
| 2015/0151723 | A1 | 6/2015 | Yang et al. |
| 2016/0137093 | A1 | 5/2016 | Shrinkle |
| 2016/0209226 | A1 | 7/2016 | Nagy et al. |
| 2016/0369826 | A1 | 12/2016 | Hassounah et al. |
| 2017/0225662 | A1 | 8/2017 | Newman et al. |
| 2017/0355354 | A1 | 12/2017 | Hassounah |
| 2019/0051947 | A1 | 2/2019 | Scheucher |
| 2019/0081502 | A1 | 3/2019 | Botts et al. |
| 2020/0206909 | A1 | 7/2020 | Goncalves et al. |
| 2020/0353838 | A1 | 11/2020 | Zhang et al. |
| 2020/0406780 | A1 | 12/2020 | Hassounah |
| 2022/0203854 | A1 | 6/2022 | Yu |

FOREIGN PATENT DOCUMENTS

| | | | |
|---|---|---|---|
| CN | 112644604 | A | 4/2021 |
| CN | 113306446 | A | 8/2021 |
| CN | 114590165 | A | 6/2022 |
| CN | 115848321 | A | 3/2023 |
| EP | 2463162 | B1 | 3/2016 |
| EP | 3490095 | A1 | 5/2019 |
| WO | 2011012601 | A2 | 2/2011 |
| WO | 2019047475 | A1 | 3/2019 |
| WO | 2019085309 | A1 | 5/2019 |
| WO | WO-2020089935 | A1 * | 5/2020 |
| WO | 2020263225 | A1 | 12/2020 |
| WO | 2021148023 | A1 | 7/2021 |
| WO | 2022064230 | A1 | 3/2022 |
| WO | 2022263936 | A1 | 12/2022 |

OTHER PUBLICATIONS

ISA, International Search Report for PCT/US2022/071461, Jul. 22, 2022.

Industrial Property Magazine, Preliminary Examination Report for BR112021025914 -7, Apr. 30, 2024.

ISA, Invitation to Pay Additional Fees for PCT/US2024/028269, Aug. 6, 2024.

ISA, Invitation to Pay Additional Fees for PCT/US2024/028273, Aug. 5, 2024.

ISA, International Search Report for PCT/US24/29678, Aug. 30, 2024.

ISA, International Search Report for PCT/US2024/029708, Aug. 14, 2024.

ISA, International Search Report for PCT/US2024/028269, Oct. 11, 2024.

ISA, International Search Report for PCT/US2024/028273, Oct. 11, 2024.

* cited by examiner

BATTERY-EXCHANGE SERVICE STATION

CROSS-REFERENCE TO RELATED APPLICATIONS

This application claims priority to U.S. Provisional Application No. 63/502,434, titled "Electric-Vehicle Service Station," filed on May 16, 2023, which is hereby incorporated by reference.

TECHNICAL FIELD

This application relates generally to battery-exchange systems for electric vehicles.

BACKGROUND

Electric vehicles (EVs) have limited range and battery life and periodically need additional electrical energy. When the EV batteries are low or depleted, they are traditionally recharged by physically coupling an electrical charger to a charge port on the vehicle. Even with rapid charging, it takes at least 30 minutes to partially recharge the batteries. Another approach is to exchange the depleted batteries with charged batteries. Battery swapping can be performed in minutes, but additional infrastructure and technology are needed.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages, and novel features of the disclosure will be set forth in the following detailed description of the disclosure when considered in conjunction with the drawings, which are intended to illustrate, not limit, the invention.

An aspect of the invention is directed to a method of operating a battery-exchange service station, comprising receiving data corresponding to a vehicle to be serviced; automatically adjusting a size of a service platform according to the vehicle, the service platform disposed over a service cavity configured to receive a service robot; automatically presenting one or more visual indicators to guide a driver of the vehicle to drive the vehicle onto the service platform such that the vehicle's front tires are at a target position on the service platform; automatically detecting a position of the vehicle's front tires with a plurality of lasers and a plurality of light sensors, each laser located at a predetermined position relative to the target position for the front tires; automatically updating at least one of the one or more visual indicators based on a detected position of the vehicle's front tires; and while the detected position is at the target position, automatically exchanging one or more depleted batteries in the vehicle, with the service robot, with one or more charged batteries.

In one or more embodiments, the method further comprises automatically adjusting a length of the service platform according to wheelbase dimensions of the vehicle; and automatically adjusting a width of the service platform according to trackwidth dimensions of the vehicle. In one or more embodiments, the method further comprises after adjusting the length and the width of the service platform, automatically opening a door of the service station to allow the vehicle to drive onto the service platform. In one or more embodiments, the method further comprises after the detected position is at the target position, automatically closing the door of the service station.

In one or more embodiments, the plurality of lasers includes a first laser, a second laser, and a third laser that are spaced along a length of the service platform, the second laser located between the first and third lasers and aligned with the target position, and the method further comprising automatically determining that the vehicle's front tires are at the target position when laser light is detected from the first and third lasers and not detected from the second laser. In one or more embodiments, the method further comprises automatically producing a first visual indication when the vehicle's front tires are at the target position; and automatically producing a second visual indication when the vehicle's front tires are at an approaching position in which the laser light is detected from the first laser and not detected from the second and third lasers, wherein the first laser is located closer to an entrance of the service station than the third laser. In one or more embodiments, the method further comprises automatically producing a third visual indication when the vehicle's front tires are at an advanced position in which the laser light is detected from the third laser and not detected from the first and second lasers.

In one or more embodiments, the method further comprises while the detected position is at the target position, receiving one or more control signals that cause the service station to automatically exchange the one or more depleted batteries with the one or more charged batteries. In one or more embodiments, the one or more control signals cause the service station to automatically lift the service platform from a lowered position to a lifted position to provide room for the service robot to automatically exchange the one or more depleted batteries with the one or more charged batteries. In one or more embodiments, the method further comprises automatically deploying a set of stairs that extend between the service platform in the lifted position and a ground elevation to allow a pedestrian to step off of the service platform during the automatic exchanging. In one or more embodiments, the method further comprises automatically clamping at least the vehicle's front tires before automatically lifting the service platform.

Another aspect of the invention is directed to a battery-exchange service station comprising a ground-supported self-standing structure to receive a vehicle to be serviced, including a plurality of side walls; and a roof attached to the side walls, the sidewalls and the roof defining a service area; a motorized platform having an adjustable size according to dimensions of the vehicle, the motorized platform located within the service area; a plurality of lasers spaced along a length of the motorized platform, each laser located at a predetermined position relative to a target position for the front tires of the vehicle; a plurality of light detectors, each light detector configured to detect laser light produced by a respective laser; a plurality of lights on or in the ground-supported self-standing structure; and a computer in communication with the light detectors, the lights, and the motorized platform, the computer including a processor and non-transitory memory operably coupled to the processor, the non-transitory memory storing computer-readable instructions that, when executed by the processor, cause the processor to automatically determine dimensions of the vehicle in response to receiving data corresponding to the vehicle; automatically send first control signals to the motorized platform to adjust a size of the motorized platform according to the dimensions of the vehicle; and automatically send second control signals to the lights to adjust a state of the lights in response to an output of the light detectors.

In one or more embodiments, the service station further comprises one or more cameras configure to capture images of the vehicle before the vehicle enters the service area, wherein the computer-readable instructions further cause the processor to determine a make and a model of the vehicle using the images.

In one or more embodiments, the lasers include a first laser, a second laser, and a third laser, the second laser aligned with the target position and located between the first and third lasers, the first laser located closer to an entrance of the ground-supported self-standing structure than third laser, the light detectors include first, second, and third light detectors that are configured to detect the laser light produced by the first, second, and third lasers, respectively, and the computer-readable instructions further cause the processor to place the lights in a first state when the laser light is detected by the first, second, and third light detectors; place the lights in a second state when the laser light is detected by the second and third light detectors but not by the first light detector; place the lights in a third state when the laser light is detected by the first and third light detectors but not by the second light detector; and place the lights in a fourth state when the laser light is detected by the first and second light detectors but not by the third light detector.

In one or more embodiments, the service station further comprises a radio-frequency identification (RFID) reader disposed on or in the ground-supported self-standing structure, the RFID reader configured to read an RFID tag on or in the vehicle, the RFID tag encoding a unique identifier corresponding to the vehicle. In one or more embodiments, the service station further comprises a motorized door disposed at an entrance of the ground-supported self-standing structure, the motorized door having a default closed state in which the motorized door blocks the entrance, wherein the computer-readable instructions further cause the processor to automatically send third control signals to the motorized door to transition the motorized door from the default closed state to an opened state upon confirmation of a status of an account associated with the unique identifier.

Another aspect of the invention is directed to a battery-exchange service station comprising a ground-supported self-standing structure to receive a vehicle to be serviced, including a plurality of side walls; and a roof attached to the side walls, the sidewalls and the roof defining a service area; a motorized platform having an adjustable size according to the vehicle, the motorized platform located within the service area; a light imaging and ranging (LiDAR) system configured to detect a position of the vehicle on the motorized platform; driver feedback means for guiding a driver onto the motorized platform; and a computer in communication with the LiDAR system, the drive feedback means, and the motorized platform, the computer including a processor and non-transitory memory operably coupled to the processor, the non-transitory memory storing computer-readable instructions that, when executed by the processor, cause the processor to automatically determine dimensions of the vehicle in response to receiving data corresponding to the vehicle; automatically send first control signals to the motorized platform to adjust a size of the motorized platform according to the dimensions of the vehicle; and automatically send second control signals to the driver feedback means to adjust a state of the driver feedback means in response to an output of the LiDAR system.

In one or more embodiments, the service station further comprises ballasts configured to guide the vehicle onto a middle of the motorized platform.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

A battery-exchange service station for swapping batteries for vehicles is disclosed. The battery-exchange service station can include a radio-frequency identification (RFID) reader that can detects the RFID tag number of an RFID tag on or in the vehicle when the vehicle is within range. A computer coupled to the RFID reader can query a database using the detected RFID tag number to determine the make and model of the approaching vehicle, its dimensions, and/or the customer's account information. The trackwidth and/or wheelbase dimensions of the vehicle can be used to automatically adjust the corresponding dimensions/configurations of a service platform for a vehicle lift in the battery-exchange service station. The RFID tag number can also be used to check the account information associated with the vehicle to confirm that the account is current and there are no outstanding issues.

After the dimensions/configurations of the service platform are adjusted and the account information is confirmed, the battery-exchange service station automatically opens the front door to allow the vehicle to drive onto the service platform. Lasers and light sensors can be placed along at least a portion of the length of the platform to detect the position of the vehicle. The light sensors can be used to drive visual indicators (and/or other indicators) to direct the vehicle to drive to and stop at the correct location on the service platform.

After the vehicle is stopped at the correct position on the platform, the battery-exchange process is performed by a battery-exchange robot below the platform. The battery-exchange process can begin automatically or after user input. The battery-exchange process includes clamping and lifting the vehicle to provide space for the battery-exchange robot. Stairs can be automatically deployed when the platform is lifted to allow the driver and/or passenger(s) to step off of the platform and even leave the battery-exchange service station. The stairs can be automatically folded when the platform is lowered after the batteries are exchanged.

A camera can be placed at the exit to capture images of the vehicle leaving the Battery-exchange service station.

Figure 1:
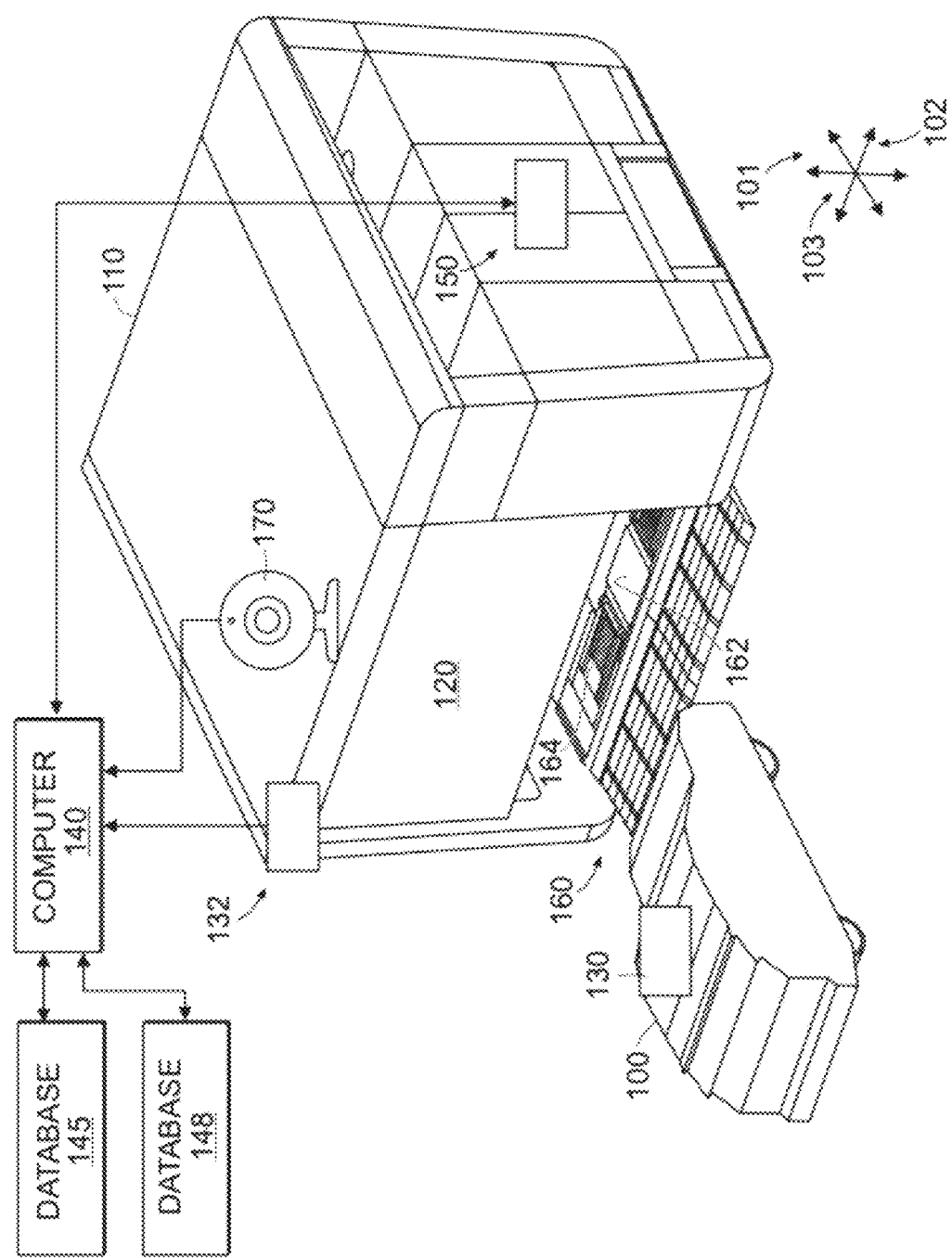
FIG. 1 is an isometric view of a vehicle approaching a battery-exchange service station according to an embodiment.

FIG. 1 is an isometric view of a vehicle 100 approaching a battery-exchange service station 110 in order to exchange one or more batteries in the vehicle 100. The vehicle 100 can be an electric vehicle or a hybrid vehicle. When the vehicle 100 initially approaches the battery-exchange service station 110, the doors 120 of the battery-exchange service station 110 are closed.

The vehicle 100 can include an RFID tag 130 that can be detected and read by an RFID reader or sensor 132 on or near the battery-exchange service station 110 to determine the RFID tag number associated with the vehicle 100. The RFID tag number can be sent to a computer 140 that is in electrical communication with the RFID reader 132. The computer 140 can use the RFID tag number to query a database 145 to determine information related to the vehicle 100. For example, the database 145 can include a user profile, account information, and the make and model of the vehicle 100. The database 145 or another database 148 can include the wheelbase dimensions and the trackwidth dimensions of the make and model of the vehicle 100 (and other vehicles).

The computer 140 can be internal or external to the battery-exchange service station 110. In addition, one or both databases 145, 148 can be internal to the computer 140 and/or can be accessed via another computer, server, and/or memory.

The computer 140 can send the wheelbase dimensions and the trackwidth dimensions for the approaching vehicle 100 to a controller 150 of a vehicle lift 160 in the battery-exchange service station 110. The controller 150 causes the vehicle lift 160 to adjust according to the wheelbase and/or trackwidth dimensions. For example, the length of the service platform 162 of the vehicle lift 160 can increase or decrease (e.g., with respect to a first axis 101) according to the wheelbase dimensions of the vehicle 100. The length of the service platform 162 can vary by moving the front and back scissor lifts for the service platform 162 towards or away from each other. In addition, the tire clamps 164 and scissor lifts of the vehicle lift 160 can move laterally inward or outward (e.g., with respect to a second axis 102 that is orthogonal to the first axis 101 and to a third axis 103) according to the trackwidth dimensions of the vehicle 100. Additional details regarding the vehicle lift 160 and battery-exchange service station 110 are disclosed in U.S. patent application Ser. No. 18/317,985, titled "Configurable Vehicle Lift and Service Station," filed on May 16, 2023, and U.S. patent application Ser. No. 18/318,001, titled "Battery-Exchange System and Service Station," filed on May 16, 2023, which are hereby incorporated by reference.

In addition or in the alternative, a camera 170 can be mounted on the battery-exchange service station 110. The camera 170 can detect when the vehicle 100 is within the field of view of the camera 170. In some embodiments, the computer 140 can determine or confirm the make and model of the vehicle 100 using images from the camera 170.

Before the vehicle lift 160 is adjusted according to the wheelbase and/or trackwidth dimensions of the vehicle 100, the computer 140 can determine or confirm that the account associated with the vehicle 100 is in good shape. For example, the computer 140 can determine whether there any balances due on the account and/or whether there are any issues or warnings associated with the account. The computer 140 can alert the driver of vehicle 100 of any account issues by sending a message to a portable wireless device, such as a smartphone, associated with and/or held by the driver. The message can be sent by text message and/or through an application running on the portable wireless device of the driver. The driver can address any account issues using his/her portable wireless device.

After any account issues are addressed and the vehicle lift 160 is adjusted according to the wheelbase and/or trackwidth dimensions of the vehicle 100, the battery-exchange service station 110 automatically opens the front door 120 to allow the vehicle 100 to drive onto the vehicle lift 160. The front door 120 can be retractable. In some embodiments, the front door 120 and a rear door are both opened.

Figure 2:
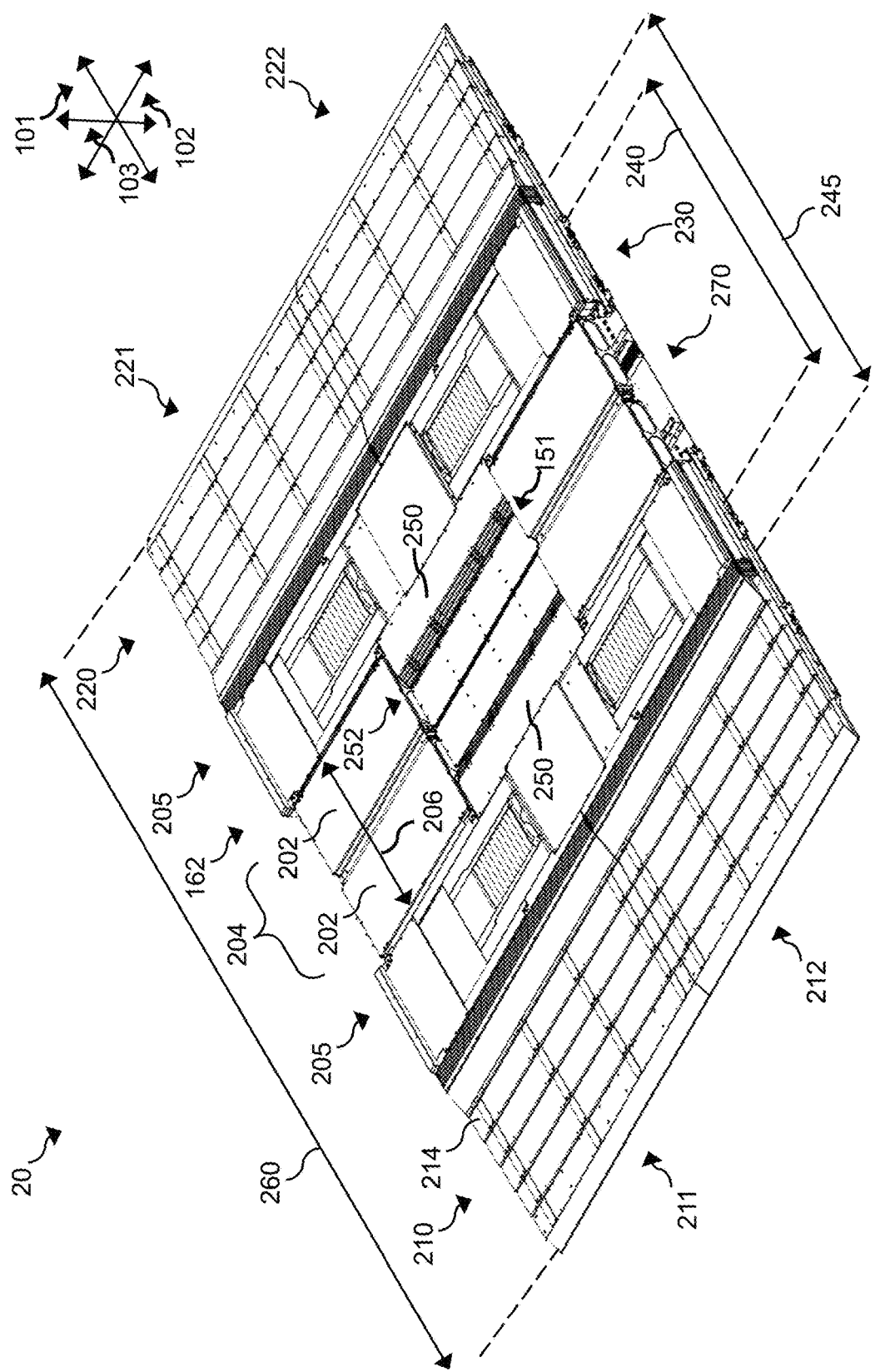
FIG. 2 is an isolated isometric view of a vehicle lift in a lowered state according to an embodiment.

FIG. 2 is an isolated isometric view of a vehicle lift 20 in a lowered state according to an embodiment. The vehicle lift 20 can be the same as the vehicle lift 160. The vehicle lift 20 includes a service platform 162, an on-ramp 210, an off-ramp 220, and a base 230. The vehicle lift 20 is supported by and placed on the ground (e.g., pavement such as in a parking lot). For example, the base 230 can be placed on the ground or another surface.

The platform 162 includes a plurality of wheel-support plates 205 that support each tire or set of tires of the vehicle. The length 240 between the wheel-support plates 205 is adjustable and set to the wheelbase dimensions of the vehicle 100. The length 240 is measured with respect to (or parallel to) a first axis 101. The length 240 can be measured with respect to the same relative location of each wheel-support plate 205, such as the middle, the front edge, or the rear edge of the wheel-support plates 205.

A plurality of floor plates 202 are located between each pair of wheel-support plates 205 along or parallel to the first axis 101. In the illustrated embodiment, two sets of floor plates 202 are located between each pair of wheel-support plates 205 along or parallel to the first axis 101. In other embodiments, there can be more than two sets (e.g., three sets, four sets, or another number of sets) or only one set of floor plates 202. Each set of floor plates 202 is in a fully-stacked configuration such that the length 240 is relatively small (e.g., the smallest) to accommodate a vehicle having minimum wheelbase dimensions, such as a small sedan. Two or more floor plates 202 can slidably engage each other to vary the length 240 between the wheel-support plates 205 and the length 245 of the service platform 162. The floor plates 202 form bridges 204 over which the vehicle 100 can drive and onto which the driver and/or passengers can stand while the vehicle 100 is being serviced (e.g., batteries exchanged). The length 206 of each bridge 204 sets the length 240 between the wheel-support plates 205 and the length 245 of the service platform 162.

The service platform 162 also includes two sets of segmented floor plates 250. Each set of floor plates 250 is configured to cover a portion of a service hole 252 when the service platform 162 is in the lowered state, for example to prevent a human from accidentally stepping into the service hole 252. The floor plates 250 remain on the floor and are not raised with the service platform 162. Each set of floor plates 250 is in a fully-stacked (e.g., overlapped) or contracted configuration that minimizes the length 240 between the wheel-support plates 205 and the length 245 of the service platform 162. As the lengths 240, 245 increase, two or more floor plates 202 from each set can slidably engage one another such that the two or more floor plates 202 at least partially overlap (e.g., in an extended configuration) to increase the length of the floor plates 202 along or parallel to the first axis 101. The service hole 252 is configured to be aligned with the underbody of the vehicle 100 when the vehicle 100 is positioned on the service platform 162.

The wheel-support plates 205 and the floor plates 202 cover and at least partially define a service cavity 270 beneath the service platform 162 where one or more robots is/are located to service the vehicle 100. The size of the service cavity 270 increases when the service platform 162 is raised to provide room for the robot(s) to exchange one or more depleted batteries with one or more charged batteries.

The on-ramp 210 and off-ramp 220 allow the vehicle 100 to drive onto and drive off of the service platform 162, respectively, along or parallel to the first axis 101. The on-ramp 210 and the off-ramp 220 can be segmented and include nestable slats 214 that allow the on-ramp 210 and the off-ramp 220 to expand and contract along or parallel to the first axis 101. The on-ramp 210 and the off-ramp 220 are illustrated in an extended state.

The on-ramp 210 can include first and second portions 211, 212 that are located adjacent to each other along or parallel to the second axis 102 that is orthogonal to the first axis 101. The first and second axes 101, 102 are orthogonal to a third axis 103 along or parallel to which the vehicle lift 20 is raised and lowered. The off-ramp 220 can include first and second portions 221, 222 that are located adjacent to each other along or parallel to the second axis 102. The first portions 211, 221 can expand and contract together. Likewise, the second portions 212, 222 can expand and contract together.

In other embodiments, the on-ramp 210 and/or the off-ramp 220 have fixed lengths with respect to the first axis 101.

In some embodiments, the slats 214 in the on-ramp 210 and in the off-ramp 220 are mechanically coupled to a respective set of floor plates 202 such that the on-ramp 210 and the off-ramp 220 transition to the extended state when the length 206 of each bridge 204 is small (e.g., in a contracted state). The on-ramp 210 and the off-ramp 220 can transition to a contracted state when the length 206 of each bridge 204 is large (e.g., in an extended state). In addition, the state or configuration of the floor plates 202 can be adjusted automatically as the lengths 206, 240, 245 vary. Thus, the overall length 260 of the vehicle lift 20 can remain constant as the lengths 206, 240, 245 are varied.

Figure 3:
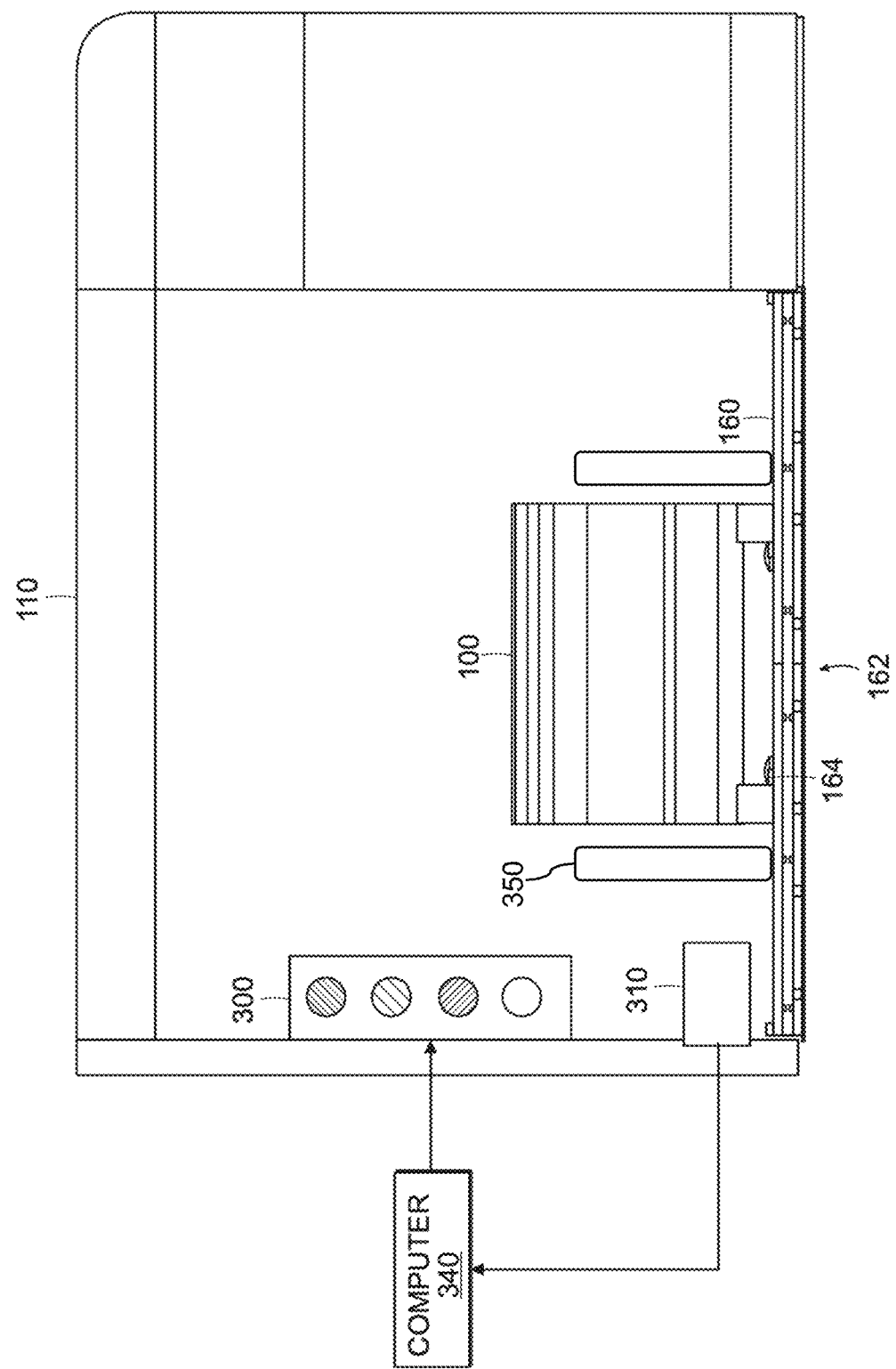
FIG. 3 is a front view of the battery-exchange service station according to an embodiment.

When the vehicle 100 drives onto the vehicle lift 160, the driver can be presented with driver feedback means to guide the driver to position the vehicle 100 on the vehicle lift 160 (e.g., on the service platform 162) correctly. For example, the driver feedback means can include lights 300 as illustrated in FIG. 3. A green light can indicate that the driver should drive the vehicle 100 forward slowly. A yellow light can indicate that the driver should drive the vehicle 100 forward very slowly (slower than when the green light is displayed). A red light can indicate that the vehicle 100 is positioned correctly and the driver should stop the vehicle 100. A white light can indicate that the driver should reverse the vehicle 100 very slowly. Only one of the lights 300 may be active at any one time, though all lights 300 are illustrated for brevity. Text, audio, and/or other indicators can also be used with the lights 300.

The battery-exchange service station 100 can include an emergency button 310 that can cause all motors and robots in the battery-exchange service station 100 to stop.

The appearance/state of the lights 300 and/or other driver feedback means can be controlled by a computer or controller 340 that is in communication (e.g., wired or wireless communication) with the lights 300 and/or other driver feedback means. The computer 340 can be the same or different than computer 140. The emergency button 310 can be electrically and/or wirelessly coupled to the computer 340 and/or to another computer. The computer 340 can be internal to the battery-exchange service station 100.

FIG. 3 also illustrates optional ballasts 350 that can be disposed on the service platform 162. The ballasts 350 can function as obstacles to guide the vehicle 150 into the middle of the service platform 162. The ballasts 350 can be removable. In some embodiments, the ballasts 350 can be raised and lowered.

Figure 4A:
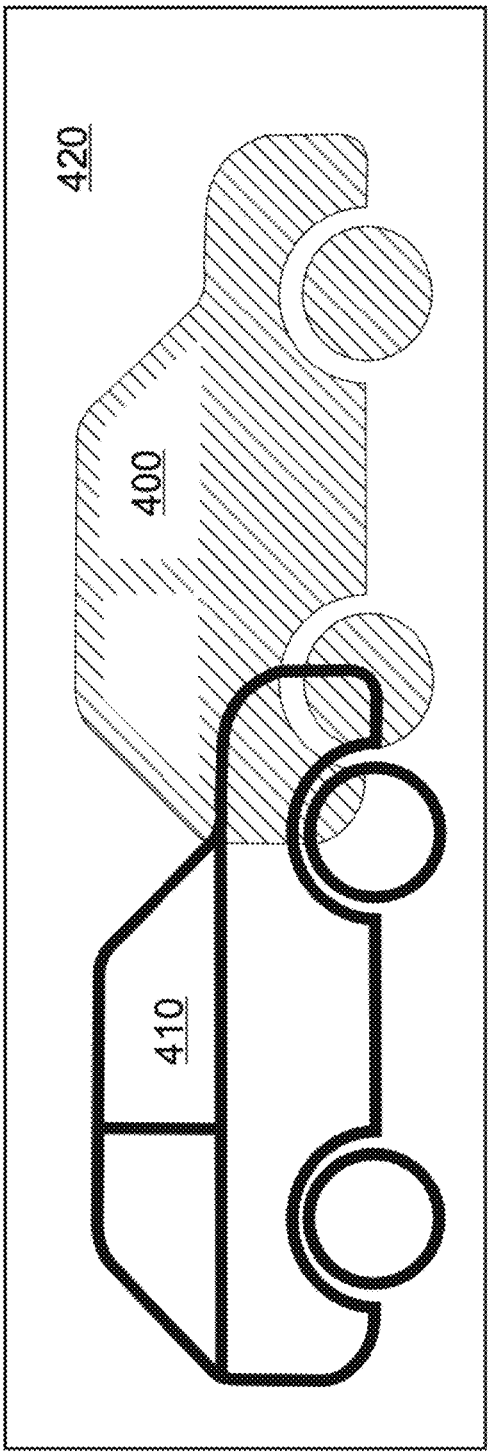
FIGS. 4A and 4B illustrates an example visual indicator in first and second states, respectively.
Figure 4B:
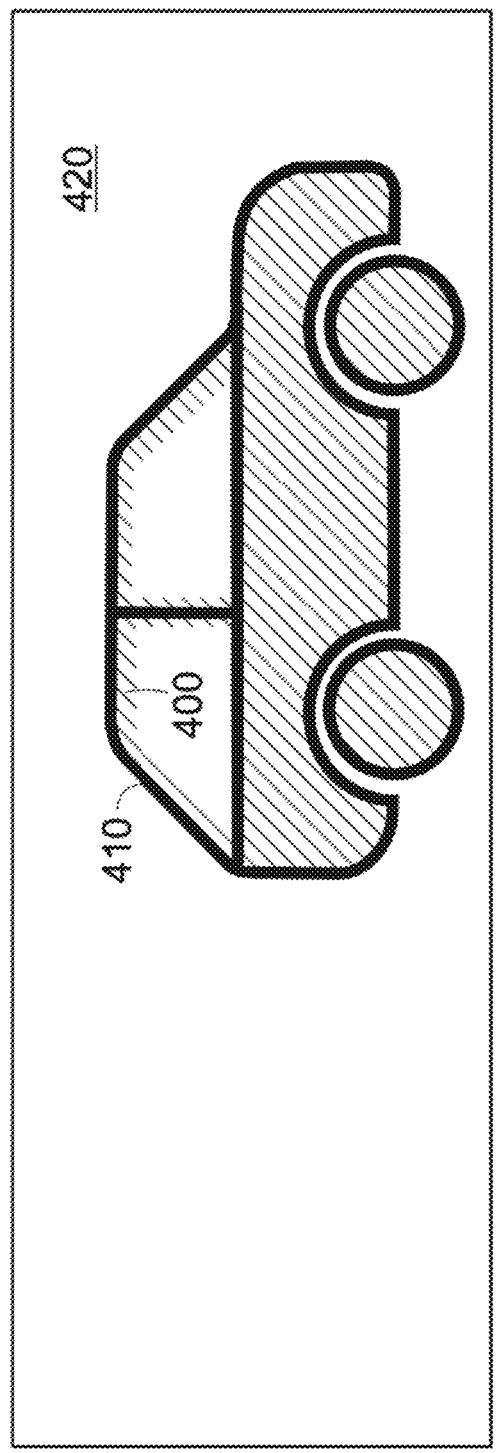

In additional or alternative embodiments, the driver feedback means can include an overlay of a target vehicle 400 and a vehicle representation 410 that represents the detected position of the vehicle 100, as illustrated in FIG. 4A. The target vehicle 400 is stationary and the vehicle representation 410 can move as the vehicle 100 drives onto the vehicle lift 160 (e.g., onto the service platform 162). The detected position of the vehicle 100 can be determined using lasers 510 and light detectors 500 (FIG. 5), a camera 520 (FIG. 5), pressure sensors on the service platform 162, and/or other vehicle position detection means. The vehicle 100 is in the correct position on the vehicle lift 160 (e.g., on the service platform 162) when the vehicle representation 410 completely overlaps the target vehicle 400, as illustrated in FIG. 4B. Colors, text, signs, video images, audio signals, and/or other driver feedback means can be used to indicate that the vehicle 100 is in the correct position and/or in the incorrect position.

The overlay of the target vehicle 400 and the vehicle representation 410 can be displayed on a display screen 420 in the battery-exchange service station 110.

Figure 5:
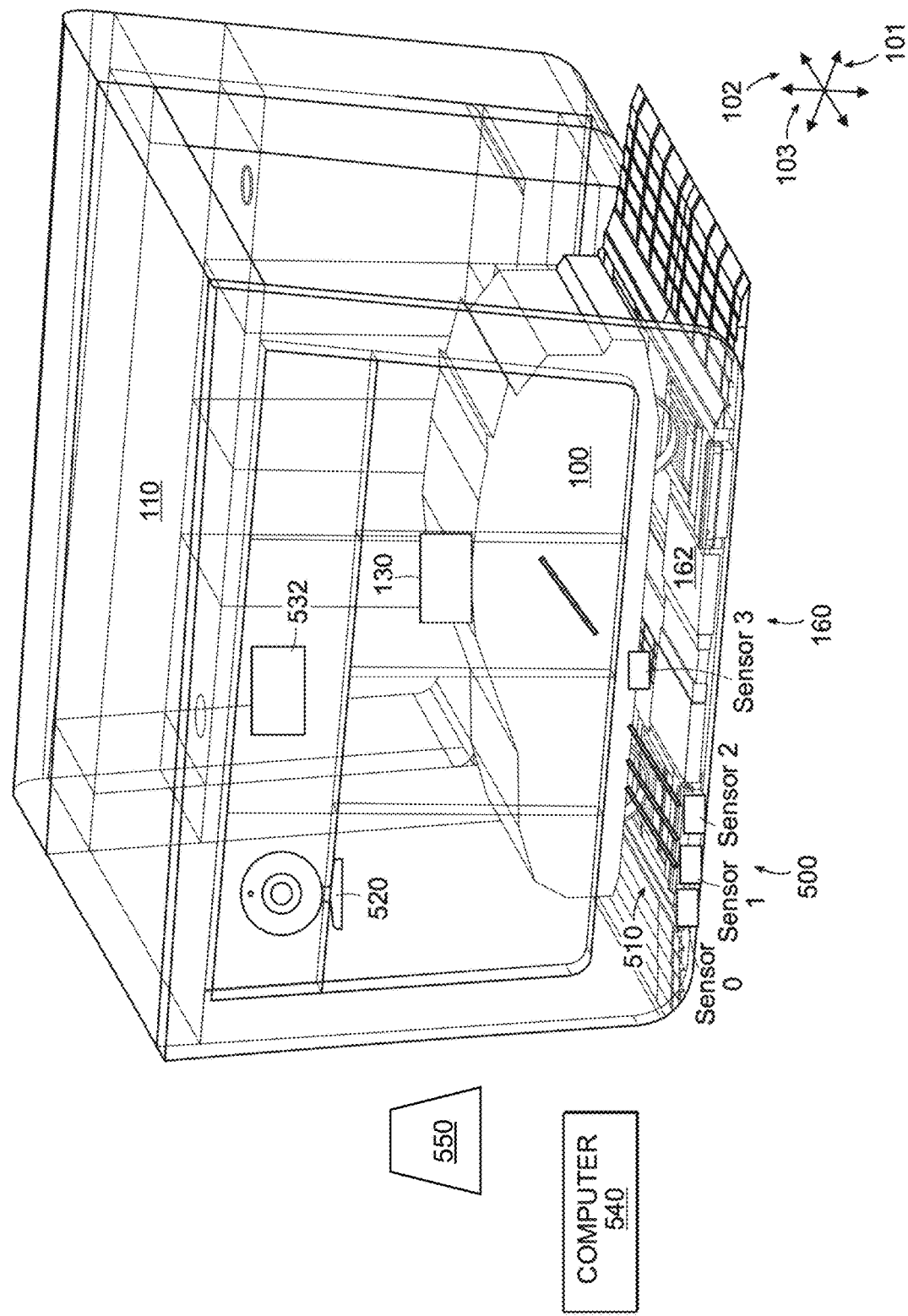
FIG. 5 is an isometric and partially transparent view of the battery-exchange service station according to an embodiment.

Lasers 510 and light detectors 500 (e.g., photoelectric detectors) can be located in the battery-exchange service station 110 to detect the position of the vehicle 100, as illustrated in FIG. 5. Some or all of the light detectors 500 can be mounted on one side of the vehicle lift 160 and/or service platform 162 to detect the presence or absence of light that can be emitted by respective lasers 510 from the other side of the vehicle lift 160. The laser light produced by the lasers 510 can be directed parallel to the trackwidth of the vehicle 100 (e.g., parallel to the second axis 102). The presence of laser light indicates that the vehicle 100 is not detected at a respective position. The absence of light indicates that the vehicle 100 is detected at a respective position. The light detectors 500 can be configured to detect one or more wavelengths of light, such as the wavelength of the lasers 510. The light detectors 500 can be replaced with and/or can include other light sensors.

In the illustrated embodiment, there are four light detectors 500 (sensors 0-3) and four respective lasers 510. Sensors 0-2 are positioned at the front of the service platform 162 to detect the position of the front tires of the vehicle 100. Sensor 1 is at the target position for the front tires. Sensor 2 is located closer to the entrance of the battery-exchange service station 110 (e.g., to the front door 120) and further from the exit of the battery-exchange service station 110 compared to sensor 1 to detect when the front tires are very close to and approaching the target position. Sensor 0 is located further from the entrance of the battery-exchange service station 110 (e.g., the front door 120) and closer to the exit of the battery-exchange service station 110 compared to sensor 1 to detect when the front tires have overshot the target position.

Sensor 3 is positioned in the middle of the service platform 162 to detect when the vehicle 100 approaches the middle of the service platform 162. Sensor 3 can be located at a higher elevation (e.g., with respect to the third axis 103) compared to sensors 0-2 to detect the body of the vehicle 100.

Using the lights 300 (FIG. 3) as an example, a green light can be displayed when the front door 120 is opened to direct the driver to drive onto the service platform 162. The green light can continue to be displayed until sensor 3 detects that the vehicle 100 has reached the middle of the service platform 162 and while sensors 0-2 are not triggered. A yellow light can be displayed when senor 3 detects that the vehicle 100 had reached the middle of the service platform 162. The orange light can indicate that the driver should drive slowly. An orange light can be displayed when sensor 2 detects that the front tires of the vehicle 100 are close to the target location. The orange light can indicate that the driver should drive forward very slowly. When the front tires move slightly forward, sensor 1 detects that the front tries are in the correct position and sensors 0 and 2 are not triggered, which causes the light to change from yellow to red to indicate that the driver should stop. If the driver does not stop the vehicle 100 in time, sensor 0 will be triggered, which causes the light to change from red to white to indicate that the driver should reverse. Sensor 3 can be a redundant detector when sensors 0-2 are triggered, for example to confirm that a vehicle 100 is on the service platform 162 and that sensors 0-2 did not malfunction. The same or similar logic can be used to visually illustrate the overlay of the target vehicle 400 and vehicle representation 410 (FIGS. 4A, 4B). Other lights, messages, audible alerts/cues, and/or visual alerts/cues can be used as driver feedback means instead of or in addition to the lights 300.

In additional or alternative embodiments, one or more cameras 520 can be used in conjunction with or instead of the light detectors 500 and laser 510 to detect the position of the vehicle 100 on the service platform 162. The camera(s) 520 can be positioned overhead and/or along the length of the service platform 162 (e.g., along the first axis 101). In additional or alternative embodiments, pressure sensors can be used to detect the position of the vehicle 100 on the service platform 162. In additional or alternative embodiments, a LiDAR (light detection and ranging) system 550 can be used to determine the position of the vehicle 100. The LiDAR system 550 can be a two-dimensional (2D) LiDAR system or a three-dimensional (3D) LiDAR system.

In some embodiments, an RFID reader or sensor 532 can be located within the battery-exchange service station 110. The RFID reader 532 can detect the RFID tag 130 on the vehicle 100 to confirm that the vehicle on the service platform 162 is the same vehicle that was detected initially outside the battery-exchange service station 110 (e.g., by RFID reader 132). The RFID reader 532 can be positioned such that the RFID reader 532 is only within range of the RFID tag 130 when the vehicle 100 is positioned correctly (or approximately correctly) on the service platform 162.

The light detectors 500, camera(s) 520, RFID reader 532, and/or LiDAR system 550 are in communication (e.g., wired or wireless) with a computer 540. The computer 540 can determine the state of each light detector 50 and/or of the LiDAR system 550 to drive the logic of the visual indicators or other driver feedback means. The computer 540 can also analyze the images from the camera(s) 520 and/or can query a database (e.g., database 145) using the RFID tag number detected by the RFID reader 532. The computer 540 can be the same or different than computer 140 and/or 340.

After the vehicle 100 has stopped in the correct location, the driver of the vehicle 100 can initiate battery swap through the driver's portable wireless device, such as through a web interface or application running thereon. Alternatively, the battery swap can begin automatically when the vehicle 100 is positioned correctly on the service platform 162. In another embodiment, a physical or virtual button (e.g., a virtual button on a screen) can be located on the wall adjacent to the service platform 162 that can be used to initiate the battery swap. An advantage of having a physical/virtual button is to require the driver to exit the vehicle, which can be used to confirm that the vehicle is in park and will not move during the battery swap. After the battery swap is initiated (e.g., by the driver), the battery-exchange service station 110 can send one or more control signals to the vehicle 100 that causes the vehicle 100 to be turned off for example by turning off the batteries in the vehicle 100. In addition, the control signals can cause or confirm the vehicle 100 to be/is placed in park.

Figure 6:
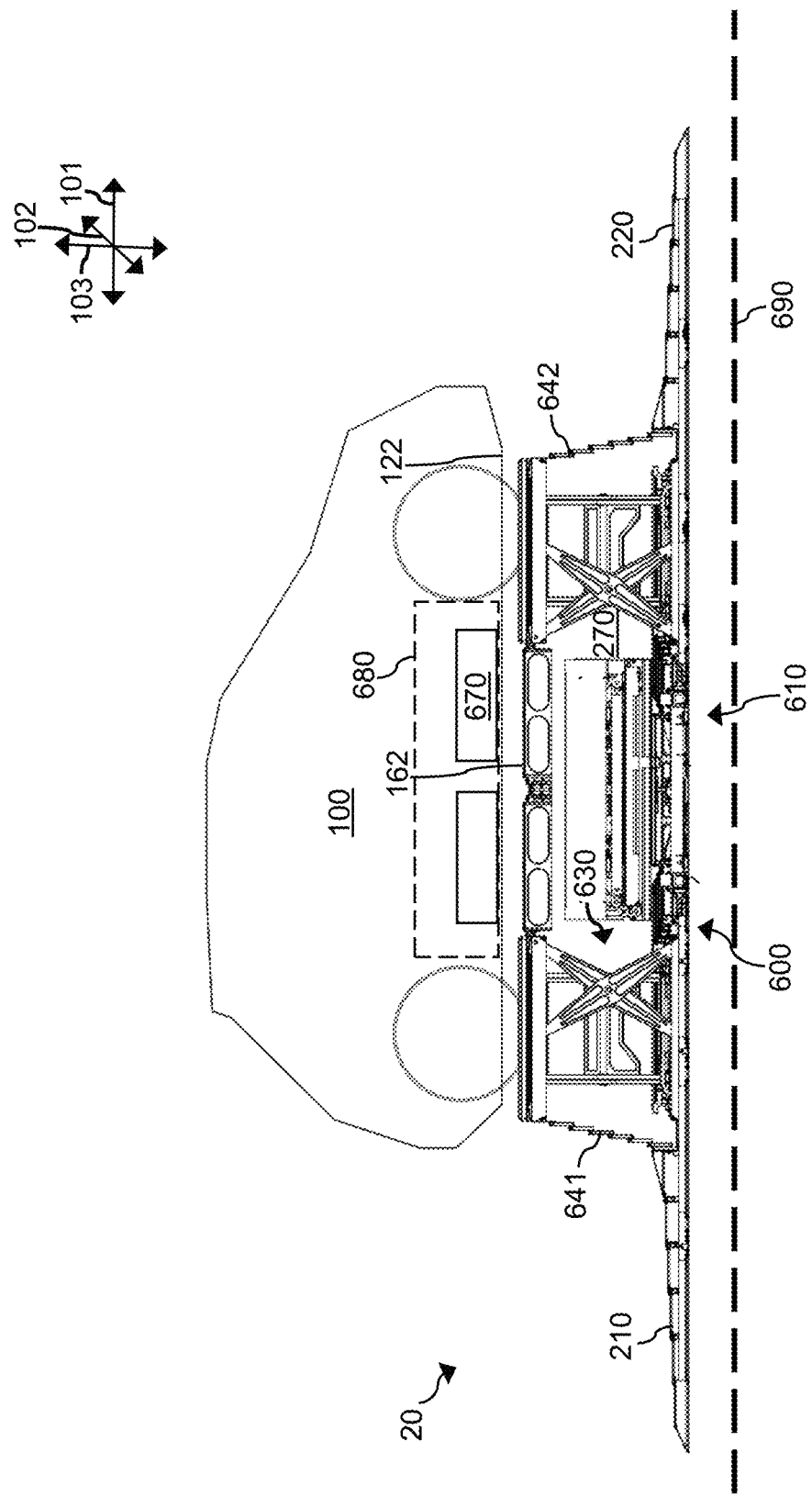
FIG. 6 is an isolated side view of the vehicle lift illustrated in FIG. 2 in a raised state.

When battery swap begins, the clamps 164 are moved outwardly to clamp the inside of the tires of the vehicle 100 and the service platform 162 is lifted to provide space for a battery-exchange robot 600 to access the service cavity 270 and the underside 122 of the vehicle 100, as illustrated in FIG. 6. The service platform 162 is mounted on motorized lifts 630 that can raise and lower the service platform 162 including the vehicle 100.

First and second expandable walls 641, 642 are attached to the service platform 162. The first expandable wall 641 is attached to the service platform 162 and the on-ramp 210. The second expandable wall 642 is attached to the service platform 162 and the off-ramp 220. In the raised position, the service platform 162 and the expandable walls 641, 642 define the service cavity 270 for the battery-exchange robot 600 to operate. The vehicle lift 20 is disposed on the ground, on a parking lot, or on another surface 690.

The battery-exchange robot 600 is mounted on a set of track or rails 610 (in general, rails) that extend along or parallel to the second axis 102. The rails 610 are preferably aligned with the middle of the service platform 162 so that the battery-exchange robot 6s00 is aligned with the middle of the service platform 162 and the middle of the vehicle 100. The battery-exchange robot 600 is configured to access the underside 122 of the vehicle 100 where one or more batteries 670 for the vehicle 100 are mounted. The battery(ies) 670 can held and/or enclosed in one or more battery trays that can be releasably secured to the underside 122 of the vehicle 100, such as to an interface plate 680. The interface plate 680 is further described in U.S. Patent Application Publication No. 2022/0314769, titled "Interface for Coupling Electric Battery and Vehicle Systems," published on Oct. 6, 2022, which is hereby incorporated by reference.

The battery-exchange robot 600 can receive and/or transport one or more depleted batteries 670 (e.g., in a battery tray) from the vehicle 100. In addition, the battery-exchange robot 600 can receive and/or transport one or more charged batteries 670 (e.g., in a battery tray) to the vehicle 100. Additional details of the battery-exchange robot are described in U.S. patent application Ser. No. 18/318,001, titled "Battery-Exchange System and Service Station."

Figure 7:
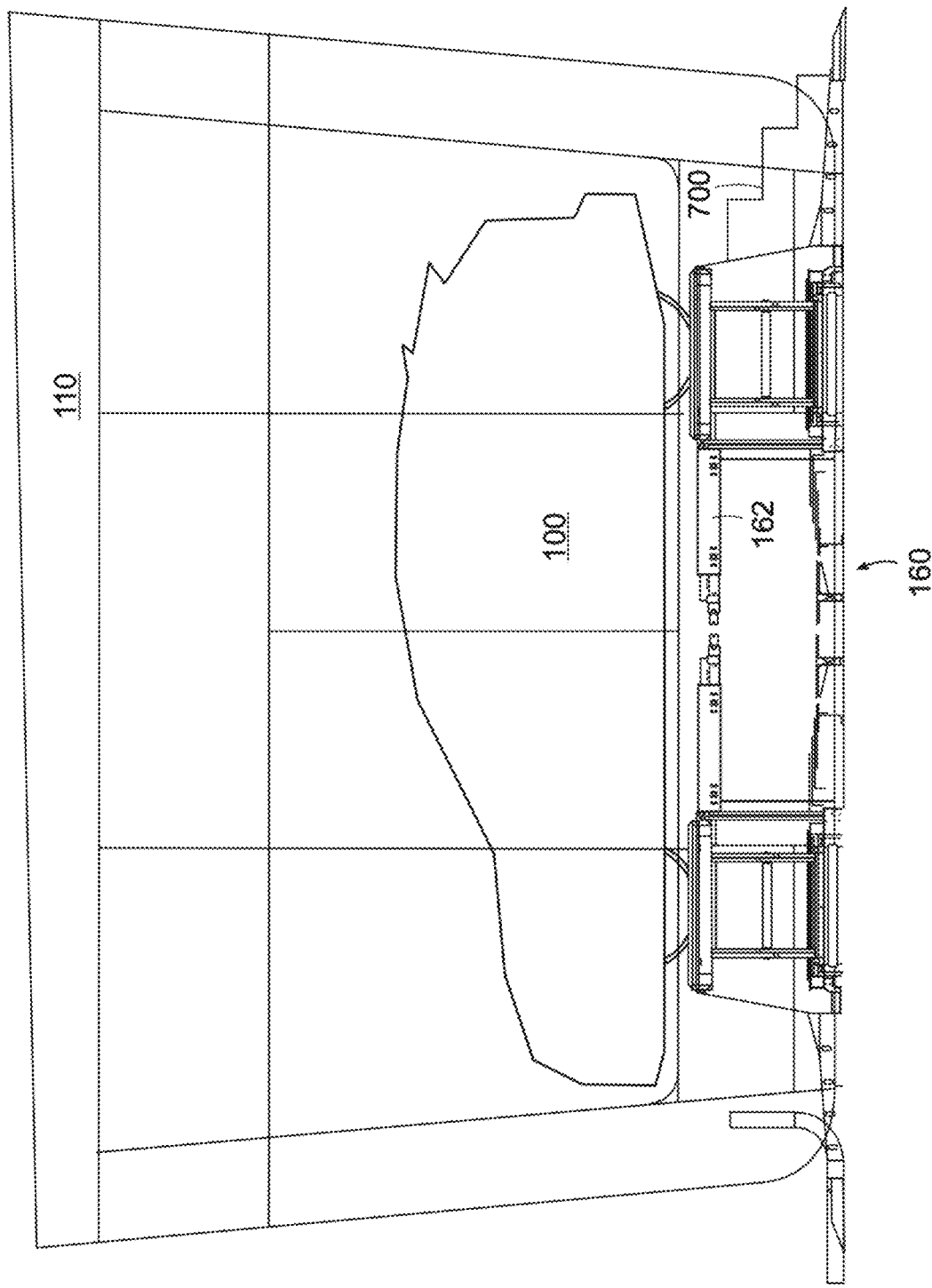
FIG. 7 is a side view and a partially transparent view of the battery-exchange service station according to an embodiment.

The driver and/or passengers can exit the vehicle 100 during clamping or after the service platform 162 is lifted. After the service platform 162 is lifted, the driver/passengers can step off the service platform 162 via stairs 700 that can be automatically deployed when the service platform 162 is lifted, for example as illustrated in FIG. 7.

Figure 8:
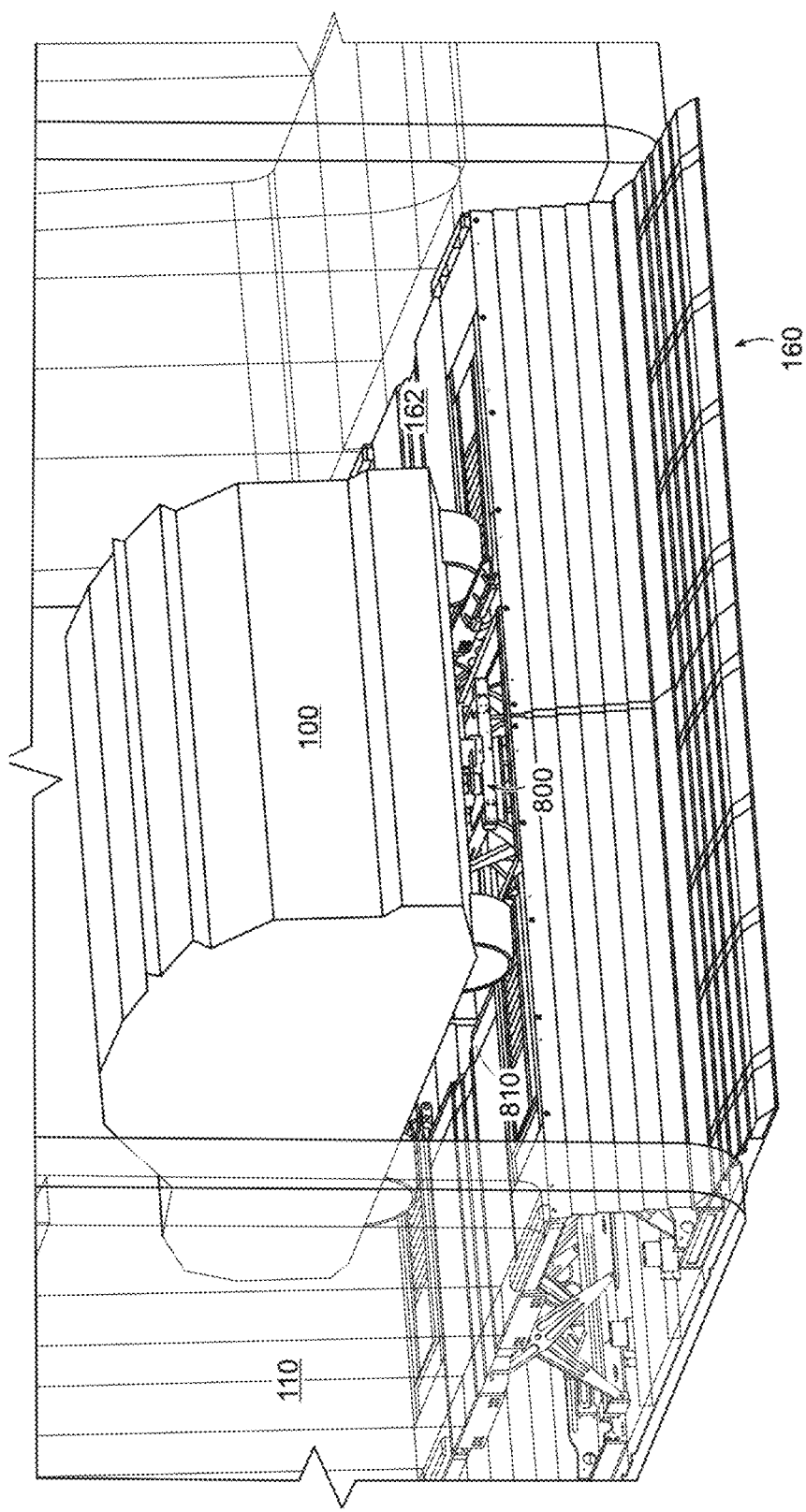
FIG. 8 is an isolated isometric view of the vehicle lift in a raised state according to an embodiment.

In the lifted position, there is some danger that a human can be injured by sticking an appendage, such as an arm, into the service hole 800 in the service platform 162, as illustrated in FIG. 8. Visual warnings 810, such as a bright yellow line, can be used to warn of this danger. In some embodiments, light sensors, such as photoelectric sensors, can be used to sense whether an object passes into the service hole 800. The light sensors can function as an interlock that immediately stops all motors and robotics when one of the light sensors is activated except when the battery-exchange robot 600 (FIG. 6) is lifted to the underside of the vehicle 100.

Figure 9:
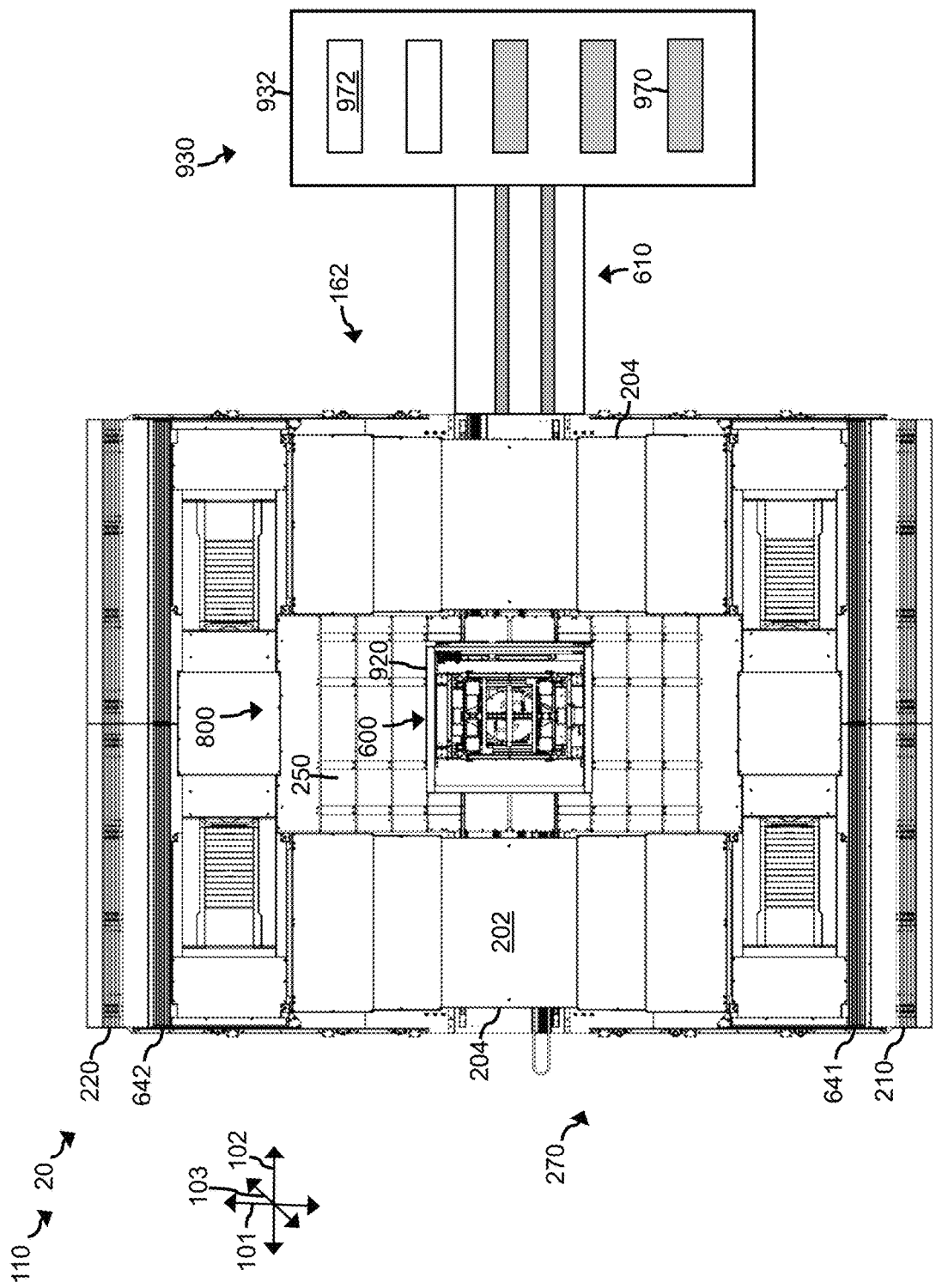
FIG. 9 is a top view of the battery-exchange service station with the walls and housing removed according to an embodiment.

FIG. 9 is a top view of the battery-exchange service station 110 with the walls and housing removed to further illustrate the service platform 110 and the battery-exchange robot 600.

The battery-exchange robot 600 is positioned in the service cavity 270 and below the service hole 800. In this position, a battery receptacle 920 of the battery-exchange robot 600 can be raised, at the position of the battery-exchange robot 600, to engage the underside 122 of the vehicle 100 (FIG. 6). Alternatively, one or more telescoping arms of the battery-exchange robot 600 can be extended along the length of the service hole 800, along or parallel to the first axis 101, to position the battery receptacle 920 beneath another portion of the underbody 122 of the vehicle 100, for example to reach a different battery.

The rails 610 for the battery-exchange robot 600 can extend to a battery-storage apparatus 930 that can hold charged and/or depleted batteries. The battery-storage apparatus 930 includes a housing 932 to hold the batteries. For example, the battery-exchange robot 600 can receive and/or transport partially or fully depleted batteries 970 that are removed from the vehicle 100 and place these depleted batteries 970 in the battery-storage apparatus 930 to be charged. The depleted batteries 970 can be charged immediately or at a later time, for example during non-peak hours when it may be more cost-efficient. Additionally or alternatively, the battery-exchange robot 600 can receive and/or transport partially or fully charged batteries 972 from the battery-storage apparatus 930 to the vehicle to be attached or secured to the vehicle 100.

Figure 10:
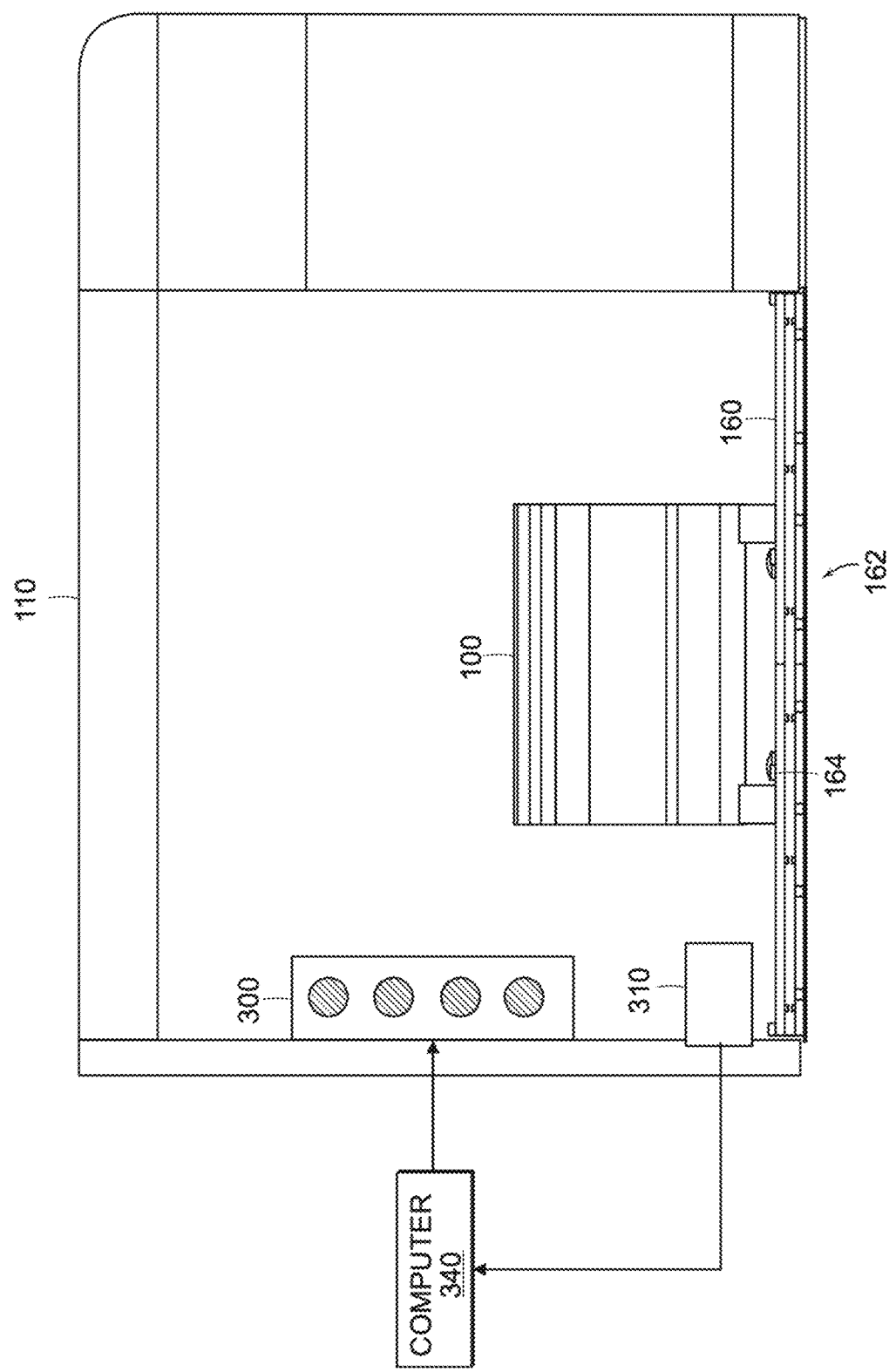
FIG. 10 is a front view of the battery-exchange service station according to an embodiment.

After the batteries are exchanged, the service platform 162 is lowered which can cause the stairs 700 to be folded/undeployed. After the service platform 162 is lowered, the clamps 164 are released (e.g., moved inwardly), as illustrated in FIG. 10. In some embodiments, some or all of the lights 300 can turn green to indicate that the battery-swap process is complete and the driver can drive the vehicle 100 out of the battery-exchange service station 110. Additional or alternative indicators can be used, such as a sound, a "thank you" message, or the like. One or more messages can also be sent to the driver's portable wireless device, such as a text message, a message on the application running on the driver's portable wireless device, etc.

Figure 11:
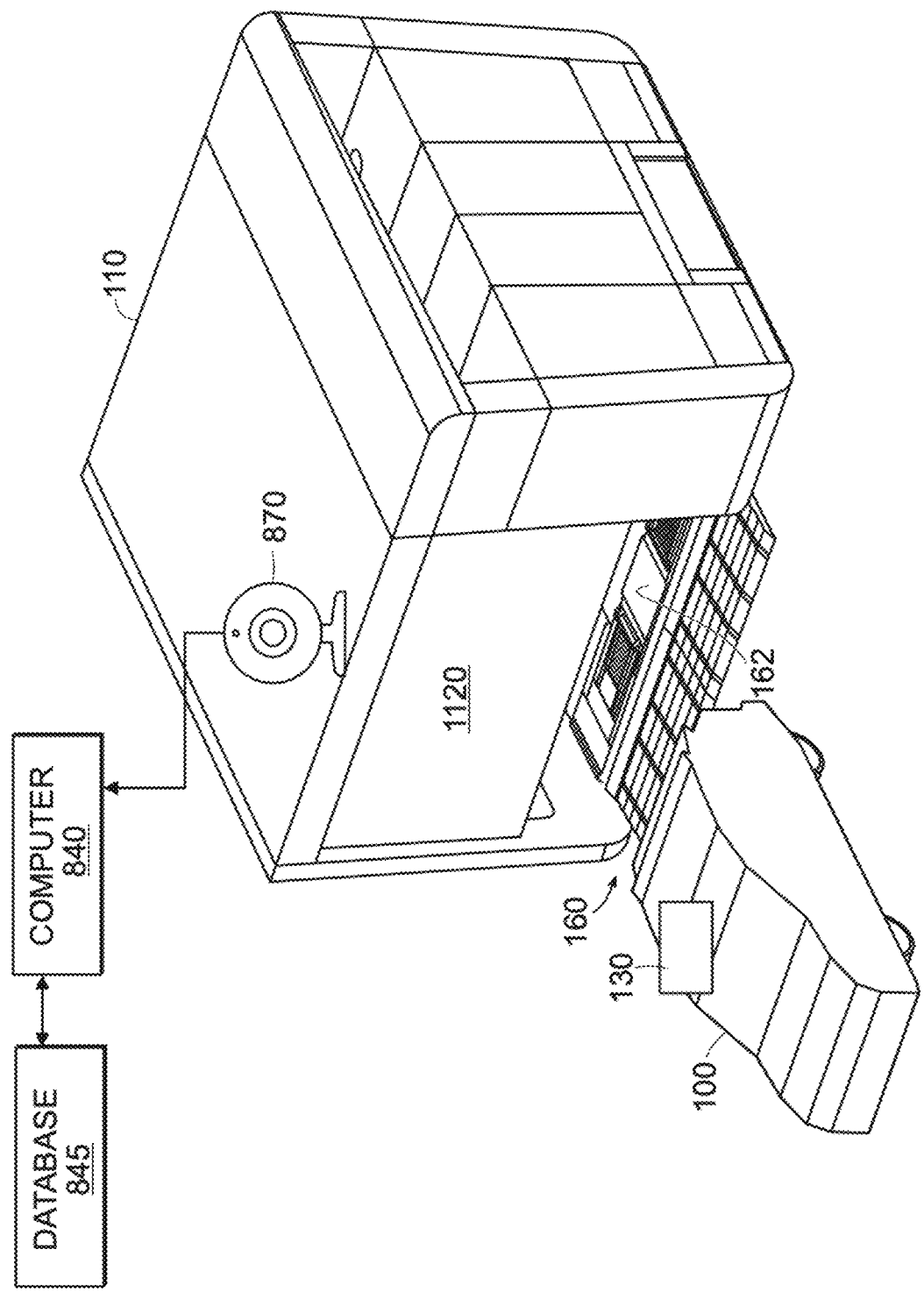
FIG. 11 is an isometric view of a vehicle leaving the battery-exchange service station according to an embodiment.

In some embodiments, a camera 870 can capture an image of the vehicle 100 as it leaves the battery-exchange service station 110 and the rear door 1120 is opened, as illustrated in FIG. 11. The image can be sent to a computer 840 that can store the image in memory and/or in a database 845. Computer 840 can be the same as or different than computer 140, 340, and/or 540.

Figure 12:
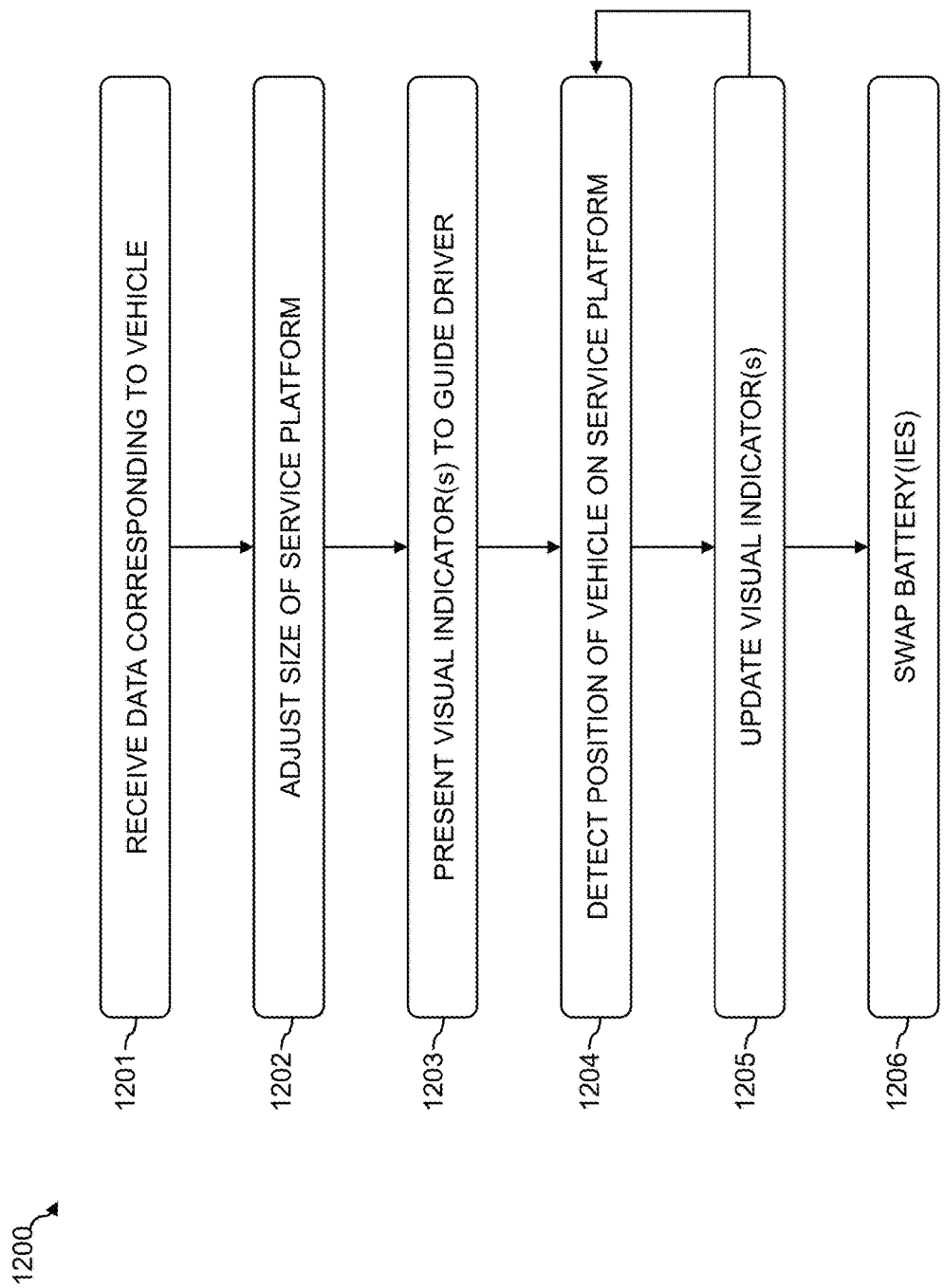
FIG. 12 is a flow chart of a method for operating a battery-exchange service station according to an embodiment.

FIG. 12 is a flow chart of a method 1200 for operating a battery-exchange service station according to an embodiment. Method 1200 can be performed using a battery-exchange service station 110.

In step 1201, the battery-exchange service station receives data corresponding to a vehicle 100 to be serviced. The data can be received by a computer such as computer 140. In one example, the data can include an RFID tag number of an RFID tag 130 on or in the vehicle 100. The RFID tag 130 can be read by an RFID reader 132 on or in the battery-exchange service station 110 and in communication (e.g., wired or wireless) with the computer 140. The RFID tag number is a unique identifier that can be assigned to the vehicle 100 and/or can be associated with a user's account. Additionally or alternatively, the computer 140 can receive the data from a user device over a local or a wide-area network. For example, the computer 140 can receive the data from a device operated by the customer such as a smartphone, a tablet, a laptop, a computer, or another device. The customer can request service (e.g., battery exchange) at the battery-exchange service station 110 using a dedicated application or a web browser on his/her device. Additionally or alternatively, the battery-exchange service station 110 can include a user interface that allows a customer to input identifying information. For example, the battery-exchange service station 110 can include a touch screen, a monitor and keyboard, or another user input means. Additionally or alternatively, the battery-exchange service station 110 can include one or more microphones to receive audio input from the user. Additionally or alternatively, the battery-exchange service station 110 can include one or more cameras (e.g., camera 170) that can identify the customer such as through facial recognition and/or that can identify the make/model of the vehicle 100 through image recognition and/or machine learning. Additionally or alternatively, the battery-exchange service station 110 can include one or more sensors that can be used to identify anatomical features of the customer such as a fingerprint reader, a retinal scanner, and/or another sensor.

The data received can be used to determine the identity (e.g., make and model) of the vehicle 100 and/or its dimensions. When the data is unique to the vehicle, the data can be used to determine the vehicle's identity and/or its dimensions such as in a database (e.g., database 145, 148). When the data is not unique to the vehicle, the data can be used to identify the customer's account number. For example, a service request received from a user device or a user interface can include data corresponding to or identifying the customer's account number. In another example, audio input data can include identifying information received in response to audible prompts. Facial and/or anatomical feature recognition can be used to match features associated with the customer that may have been obtained previously, for example during account setup, and stored in a database.

The identity (e.g., make and model) of the vehicle 100 and/or its dimensions can be determined using the customer's account number. When the customer's account is associated with more than one vehicle, the customer may be prompted to select the vehicle 100 to be serviced. Alternatively, the service request can identify the vehicle 100 to be serviced.

The vehicle's dimensions can be associated with the identity of the vehicle (e.g., in the same database). Alternatively, the vehicle's identity can be used to determine the vehicle's dimensions in another database, such as database 148. The vehicle's dimensions include its trackwidth and/or wheelbase dimensions.

In some embodiments, before allowing the customer to use the battery-exchange service station, the computer can use the received data to determine the customer's account number and to confirm that the account is in order. For example, the computer can confirm that there are no outstanding balances and/or that payment information, such as a credit card number or bank account number, is on file and still valid (e.g., the credit card is has not expired).

The doors 120 of the battery-exchange service station can be closed during this step.

In step 1202, the battery-exchange service station automatically adjusts the size of a service platform 162 of a vehicle lift 160 according to the vehicle 100 to be serviced. The size of the service platform 162 can be adjusted to match the trackwidth and/or wheelbase dimensions of the vehicle 100.

The doors 120 of the battery-exchange service station can remain closed until the size of the service platform 162 is adjusted. After the size of the service platform 162 is adjusted, the front door or both doors of the battery-exchange service station can be opened to allow the vehicle 100 to drive onto the service platform 162.

In step 1203, one or more visual indicators is/are presented automatically to guide the driver onto the service platform 162 and to stop at a target position on the service platform 162. The visual indicator(s) can include one more lights 300, where the state of the light(s) 300 can provide visual feedback guidance to the driver. The visual indicator(s) can include driver feedback means.

Initially, the visual indicator(s) and/or driver feedback means can indicate for the driver to drive onto the service platform 162 at a first speed (e.g., relatively slow speed).

In step 1204, the position of the vehicle 100 on the service platform 162 is determined automatically. The vehicle position can be determined using a plurality of lasers 510 and light sensors (e.g., photoelectric sensors 500) (FIG. 5). Additionally or alternatively, the vehicle position can be determined using one or more cameras 520, pressure sensors, radar, a LIDAR system 550 (FIG. 5), and/or other position sensing devices.

In step 1205, the visual indicator(s) (and/or driver feedback means) is/are updated automatically based on the vehicle position of detected in step 1204. Steps 1204 and 1205 can be automatically repeated in a loop until the detected vehicle position matches (or approximately matches) the target position.

For example, the visual indicator(s) (and/or driver feedback means) can be in a first state (or an initial state) when the drive initially drives onto the service platform 162. The first/initial state be a first color (e.g., green), a first message (e.g., "go"), and/or another visual indicator. The visual indicator(s) (and/or driver feedback means) can remain in the first/initial state until the vehicle 100 reaches a first position on the service platform 162. For example, the visual indicator(s) (and/or driver feedback means) can remain in the first/initial state until the vehicle 100 blocks laser light produced by a first laser 410 (e.g., corresponding to Sensor 3 (FIG. 4)).

When the vehicle 100 reaches the first position on the service platform 162, the visual indicator(s) (and/or driver feedback means) can automatically transition to a second state. The second state be a second color (e.g., yellow), a second message (e.g., "slow"), and/or another visual indicator. The visual indicator(s) (and/or driver feedback means) can remain in the second state until the vehicle 100 reaches a second position on the service platform 162. For example, the visual indicator(s) (and/or driver feedback means) can remain in the second state until the vehicle 100 blocks laser light produced by a second laser 410 (e.g., corresponding to Sensor 2 (FIG. 4)).

When the vehicle 100 reaches the second position on the service platform 162, the visual indicator(s) (and/or driver feedback means) can automatically transition to a third state. The third state be a third color (e.g., orange), a third message (e.g., "very slow"), and/or another visual indicator. The visual indicator(s) (and/or driver feedback means) can remain in the third state until the vehicle 100 reaches a third position on the service platform 162. For example, the visual indicator(s) can remain in the third state until the vehicle 100 blocks laser light produced by a third laser 410 (e.g., corresponding to Sensor 1 (FIG. 4)). The third laser 410 can be aligned with the target position for the vehicle 100 on the service platform 162.

When the vehicle 100 reaches the third position (e.g., the target position) on the service platform 162, the visual indicator(s) (and/or driver feedback means) can automatically transition to a fourth state. The fourth state be a fourth color (e.g., red), a fourth message (e.g., "stop"), and/or another visual indicator. If the vehicle 100 passes the third position and reaches a fourth position on the service platform 162, can transition to a fourth state. The fourth state be a third color (e.g., white), a fourth message (e.g., "backup slowly"), and/or another visual indicator. The fourth position 410 can be detected when the vehicle 100 blocks laser light produced by a fourth laser 410 (e.g., corresponding to Sensor 0 (FIG. 4)). The third laser 410 is located between the second and fourth lasers 410, where the fourth laser 410 is located closer to the exit of the battery-exchange service station and the offramp of the service platform 162 than the second laser 410. Conversely, the second laser 410 is located closer to the entrance of the battery-exchange service station and the onramp of the service platform 162 than the fourth laser 410.

The visual indicator(s) (and/or driver feedback means) can remain in the fourth state until the vehicle 100 returns to the third/target position when the visual indicator(s) can automatically transition to the third state.

In step 1206, one or more depleted batteries in the vehicle 100 is/are exchanged automatically with one or more charged batteries from the battery-exchange service station using a service robot.

Exchanging the battery (ies) can include lifting the vehicle 100 on the service platform 162 using a vehicle lift 160 to provide space for the service robot to access the underside of the vehicle 100 where the vehicle battery (ies) are located. The tires of the vehicle 100 can be secured with clamps 164 before the vehicle 100 is lifted.

After the battery (ies) is/are exchanged, the vehicle lift 160 is lowered and the clamps 164 are released from the tires. Visual, audio, and/or other indicators can then be automatically presented to indicate that the battery-exchange process is complete and that the vehicle 100 can exit the battery-exchange service station. In some embodiments, a camera 870 can capture an image of the vehicle 100 as it leaves the battery-exchange service station.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A battery-exchange service station comprising:
   a ground-supported self-standing structure to receive a vehicle to be serviced, including:
      a plurality of side walls; and
      a roof attached to the side walls, the sidewalls and the roof defining a service area;
   a motorized platform having an adjustable size according to dimensions of the vehicle, the motorized platform located within the service area;
   a plurality of lasers spaced along a length of the motorized platform, each laser located at a predetermined position relative to a target position for the front tires of the vehicle;
   a plurality of light detectors, each light detector configured to detect laser light produced by a respective laser;
   a plurality of lights on or in the ground-supported self-standing structure; and
   a computer in communication with the light detectors, the lights, and the motorized platform, the computer including a processor and non-transitory memory operably coupled to the processor, the non-transitory memory storing computer-readable instructions that, when executed by the processor, cause the processor to:
- automatically determine dimensions of the vehicle in response to receiving data corresponding to the vehicle;
- automatically send first control signals to the motorized platform to adjust a size of the motorized platform according to the dimensions of the vehicle; and
- automatically send second control signals to the lights to adjust a state of the lights in response to an output of the light detectors.

2. The service station of claim 1, further comprising one or more cameras configure to capture images of the vehicle before the vehicle enters the service area, wherein the computer-readable instructions further cause the processor to determine a make and a model of the vehicle using the images.

3. The service station of claim 1, wherein:
- the lasers include a first laser, a second laser, and a third laser, the second laser aligned with the target position and located between the first and third lasers, the first laser located closer to an entrance of the ground-supported self-standing structure than third laser,
- the light detectors include first, second, and third light detectors that are configured to detect the laser light produced by the first, second, and third lasers, respectively, and
- the computer-readable instructions further cause the processor to:
  - place the lights in a first state when the laser light is detected by the first, second, and third light detectors;
  - place the lights in a second state when the laser light is detected by the second and third light detectors but not by the first light detector;
  - place the lights in a third state when the laser light is detected by the first and third light detectors but not by the second light detector; and
  - place the lights in a fourth state when the laser light is detected by the first and second light detectors but not by the third light detector.

4. The service station of claim 1, further comprising a radio-frequency identification (RFID) reader disposed on or in the ground-supported self-standing structure, the RFID reader configured to read an RFID tag on or in the vehicle, the RFID tag encoding a unique identifier corresponding to the vehicle.

5. The service station of claim 4, further comprising a motorized door disposed at an entrance of the ground-supported self-standing structure, the motorized door having a default closed state in which the motorized door blocks the entrance, wherein the computer-readable instructions further cause the processor to automatically send third control signals to the motorized door to transition the motorized door from the default closed state to an opened state upon confirmation of a status of an account associated with the unique identifier.

6. A battery-exchange service station comprising:
- a ground-supported self-standing structure to receive a vehicle to be serviced, including:
  - a plurality of side walls; and
  - a roof attached to the side walls, the sidewalls and the roof defining a service area;
- a motorized platform having an adjustable size according to the vehicle, the motorized platform located within the service area;
- a light imaging and ranging (LiDAR) system configured to detect a position of the vehicle on the motorized platform;
- driver feedback means for guiding a driver onto the motorized platform; and
- a computer in communication with the LiDAR system, the drive feedback means, and the motorized platform, the computer including a processor and non-transitory memory operably coupled to the processor, the non-transitory memory storing computer-readable instructions that, when executed by the processor, cause the processor to:
  - automatically determine dimensions of the vehicle in response to receiving data corresponding to the vehicle;
  - automatically send first control signals to the motorized platform to adjust a size of the motorized platform according to the dimensions of the vehicle; and
  - automatically send second control signals to the driver feedback means to adjust a state of the driver feedback means in response to an output of the LiDAR system.

7. The battery-exchange service station of claim 6, further comprising ballasts configured to guide the vehicle onto a middle of the motorized platform.

* * * * *